3,108,856
SEPARATION OF DIBORANE FROM AN ADMIXTURE OF DIBORANE AND HYDROGEN
James R. Newberry, Niagara Falls, and James B. O'Hara, Kenmore, N.Y., assignors, by mesne assignments, to Olin Mathieson Chemical Corporation, a corporation of Virginia
Filed Oct. 31, 1955, Ser. No. 543,646
3 Claims. (Cl. 23—204)

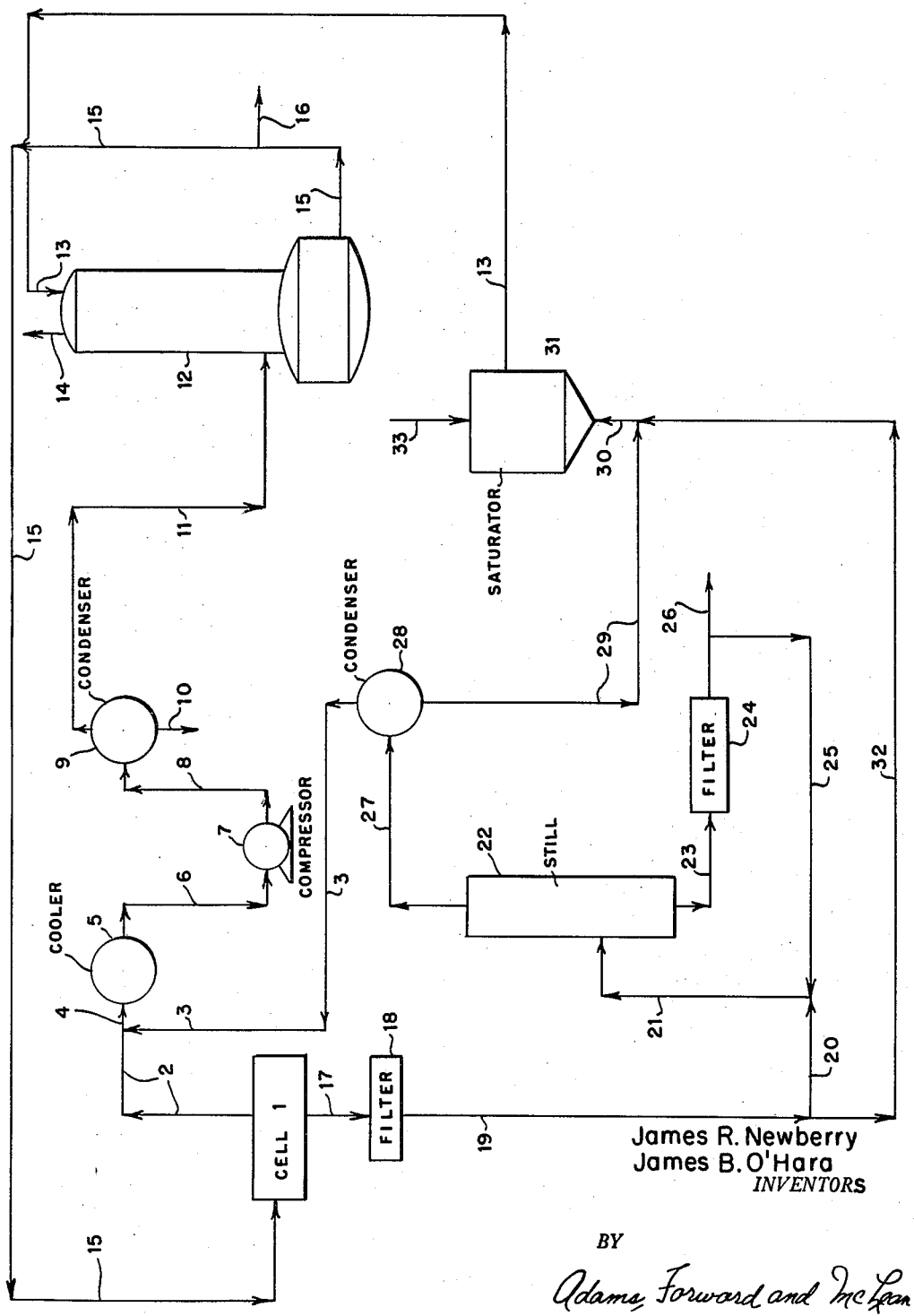

This application relates to a method for the recovery of diborane from gaseous mixtures containing diborane and hydrogen.

Walter J. Sakowski application Serial No. 499,755, filed April 6, 1955, describes a method for the production of diborane which involves electrolyzing a solution of an alkali metal borohydride in the dimethyl ether of diethylene glycol or similar solvent for the borohydride. When the process is carried out, a gaseous mixture of diborane and hydrogen is produced at the anode. The diborane can be separated from the hydrogen by the use of low temperature condensers, inasmuch as diborane has a considerably lower vapor pressure than does hydrogen. Diborane is an expensive material, however, so that it is desirable that substantially all of the diborane present in the diborane-hydrogen mixture be recovered. This is difficult to accomplish in practice by the use of low temperature condensers, since diborane does in fact have an appreciable vapor pressure even though that vapor pressure is considerably lower than that of hydrogen.

In accordance with the present invention, a new method has been devised whereby diborane can be effectively recovered or removed from a gaseous mixture which consists essentially of diborane and hydrogen. This method involves compressing the gaseous mixture and thereafter cooling the compressed mixture in order to separate out a portion of liquefied diborane. The gaseous mixture which remains after the cooling operation has a reduced content of diborane and it is passed into contact with a solution of an alkali metal borohydride in the dimethyl ether of monoethylene glycol, the dimethyl ether of diethylene glycol, the dimethyl ether of triethylene glycol, the dimethyl ether of tetraethylene glycol or a mixture of such ethers. When this is done, a complex is formed between the alkali metal borohydride and the diborane, in accordance with the following equation in the case of sodium borohydride:

$$NaBH_4 + \tfrac{1}{2} B_2H_6 \rightarrow NaBH_4 \cdot BH_3$$

As a result of the complex formation, substantially all of the diborane is removed from the gas stream, so that substantially only hydrogen remains in gaseous form. The solution of the complex in the ether can be recycled to the electrolytic cell, wherein diborane is released from the complex and can be recovered in the compression and liquefaction steps.

Example

A representative operation falling within the scope of the present invention will now be described in conjunction with the accompanying drawing.

In the drawing the numeral 1 designates an electrolytic cell which is operated in the manner described in application Serial No. 499,755 to produce a mixture of diborane and hydrogen which flows through line 2 at the rate of 158.1 pounds of diborane per hour and 6.9 pounds of hydrogen per hour. The temperature of this gaseous mixture is 60° C. The gaseous mixture passing through line 2 is admixed with 27 pounds per hour of diborane passing through line 3. The source of this diborane will be explained hereinafter. The gases pass through line 4 and into cooler 5 wherein they are cooled to −40° C. by means of refrigeration. From cooler 5 the gases pass by means of line 6 to compressor 7 wherein the gases are compressed from approximately atmospheric pressure to about 65 p.s.i.g., the temperature of the gases being raised to 46° C. as a result of the heat generated during the compression. The compressed gases flow by means of line 8 into condenser 9, from the bottom of which 66.6 pounds per hour of liquid diborane having a temperature of −63° C. is removed through line 10. Gases uncondensed in condenser 9, amounting to 118.4 pounds of diborane per hour and 6.9 pounds of hydrogen per hour at a temperature of −63° C., pass by means of line 11 into tower 12.

Tower 12 is operated at about atmospheric pressure and into it through line 13 is passed a solution of $NaBH_4 \cdot BH_3$, sodium borohydride and diborane in the dimethyl ether of diethylene glycol. This solution has a temperature of 35° C. and flows at such a rate that the respective flow rates for $NaBH_4 \cdot BH_3$, sodium borohydride, diborane and dimethyl ether of diethylene glycol in pounds per hour are: 4788; 333; 32 and 44,176. The source of the stream will be described hereinafter. Through line 14 hydrogen flows at the rate of 6.9 pounds per hour. From the bottom of tower 12 through line 15, there is removed a solution of $NaBH_4 \cdot BH_3$, sodium borohydride and diborane in the dimethyl ether of diethylene glycol flowing at such a rate as to carry 5225 pounds of $NaBH_4 \cdot BH_3$ per hour, 13 pounds of sodium borohydride per hour, 33 pounds of diborane per hour and 44,176 pounds of the dimethyl ether of diethylene glycol per hour. The stream passing through line 15 has a temperature of 35° C. Line 16 is provided for the event that it is desired to remove a quantity of this stream from the system for any reason.

From the bottom of cell 1 and through line 17 there passes a solution of $NaBH_4 \cdot BH_3$ and diborane in the dimethyl ether of diethylene glycol at the rate of 4885 pounds of $NaBH_4 \cdot BH_3$ per hour, 33 pounds of diborane per hour and 44,176 pounds of the dimethyl ether of diethylene glycol per hour. This mixture is introduced into filter 18, wherein any solids present are removed, and the mixture then passes through line 19. A portion of the solution passing through line 19 goes through line 20 and thence through line 21 into still 22. The flow rate through line 20 amounts to 98 pounds of $NaBH_4 \cdot BH_3$ per hour, 0.8 pound of diborane per hour, and 1172 pounds of the dimethylether of diethylene glycol per hour. The function of still 22 is to purify the dimethyl ether of diethylene glycol by distillation at atmospheric pressure. The still bottoms are cycled through line 23, filter 24 and line 25, the purpose of filter 24 being to remove solids formed as a result of the distillation. Line 26 is provided in the event that it is desired to purge a portion of the dimethyl ether of diethylene glycol present in the system. Overhead through line 27 there passes 27 pounds of diborane per hour and 886 pounds of the dimethyl ether of diethylene glycol per hour. The vapors passing through line 27 have a temperature of 165° C. and they enter condenser 28. Twenty-seven pounds per hour of diborane at a temperature of 20° C. remain uncondensed in condenser 28 and pass by means of lines 3 and 4 into cooler 5. 886 pounds per hour of the dimethyl ether of diethylene glycol are liquefied in condenser 28 at a temperature of 25° C. and they pass by means of lines 29 and 30 into saturator 31.

That portion of the material flowing through line 32 but not through line 20, amounting to 4788 pounds of $NaBH_4 \cdot BH_3$ per hour, 32 pounds of diborane per hour and 43,280 pounds of the dimethyl ether of diethylene glycol per hour, pass through line 32 and thence into the bottom of saturator 31 by means of line 30. Sodium borohydride is introduced into the top of saturator 31 by means of line 33 at the rate of 333 pounds per hour.

As those skilled in the art will understand, the molar ratio of diborane to hydrogen present in the gaseous stream treated by compression, cooling and extraction in accordance with the present invention can vary widely. In general, however, the molar ratio of diborane to hydrogen will be within the range from 1.5 to 2.5.

It is claimed:

1. In the separation of diborane from a gaseous mixture consisting essentially of diborane and hydrogen, the steps of compressing the mixture, cooling the compressed mixture whereby a quantity of liquid diborane is condensed and there remains an uncondensed gaseous mixture of diborane and hydrogen, separating the liquid diborane from the uncondensed gaseous mixture, contacting the uncondensed gaseous mixture with a solution of an alkali metal borohydride and at least one solvent selected from the group consisting of the dimethyl ether of monoethylene glycol, the dimethyl ether of diethylene glycol, the dimethyl ether of triethylene glycol, and the dimethyl ether of tetraethylene glycol whereby a complex of the alkali metal borohydride and diborane is formed and separating hydrogen from the resulting solution of the complex.

2. The method of claim 1 wherein the alkali metal borohydride is sodium borohydride.

3. The method of claim 1 wherein said solvent is the dimethyl ether of diethylene glycol.

References Cited in the file of this patent

UNITED STATES PATENTS

| | | |
|---|---|---|
| 2,596,690 | Hurd | May 13, 1952 |
| 2,615,788 | Gibb | Oct. 28, 1952 |